Patented Oct. 9, 1923.

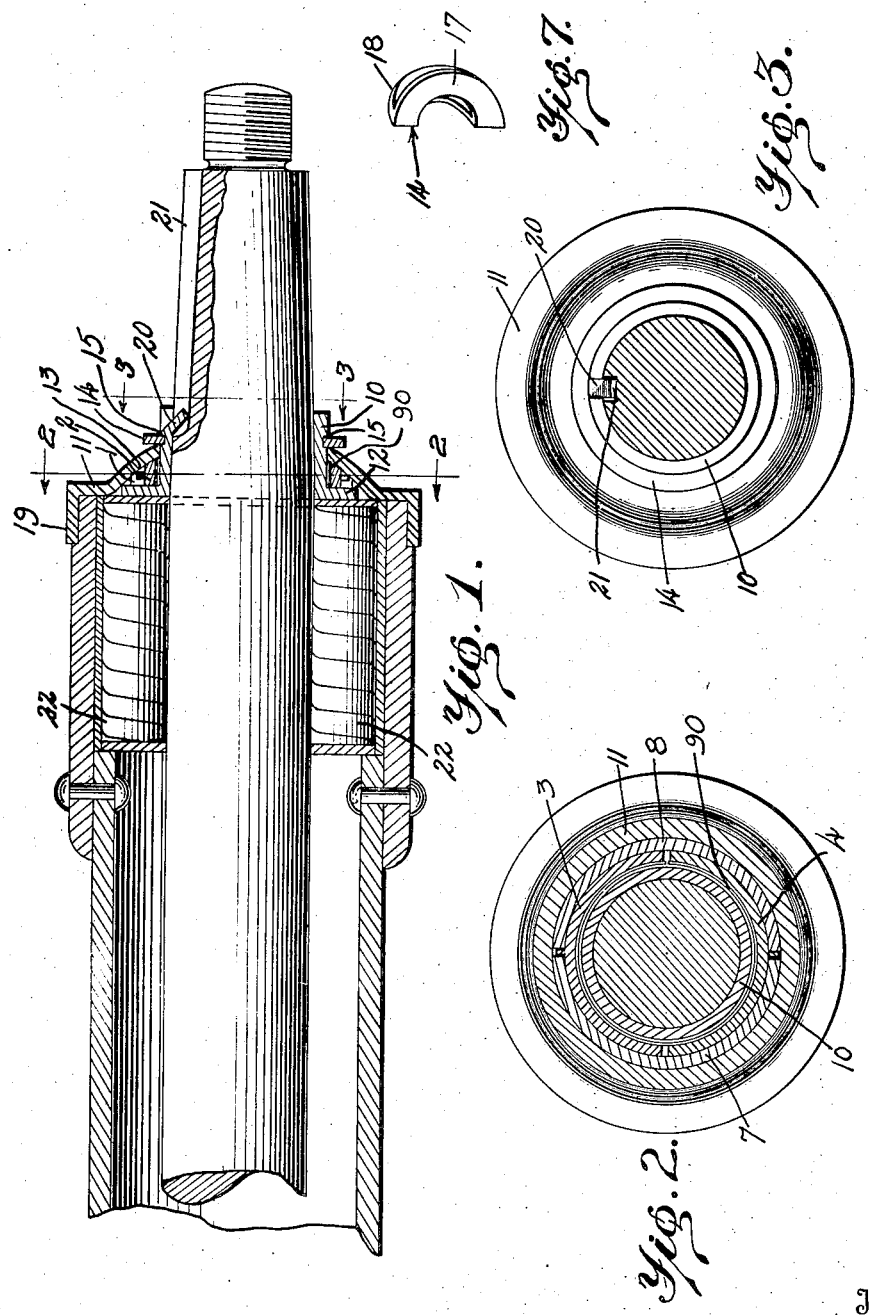

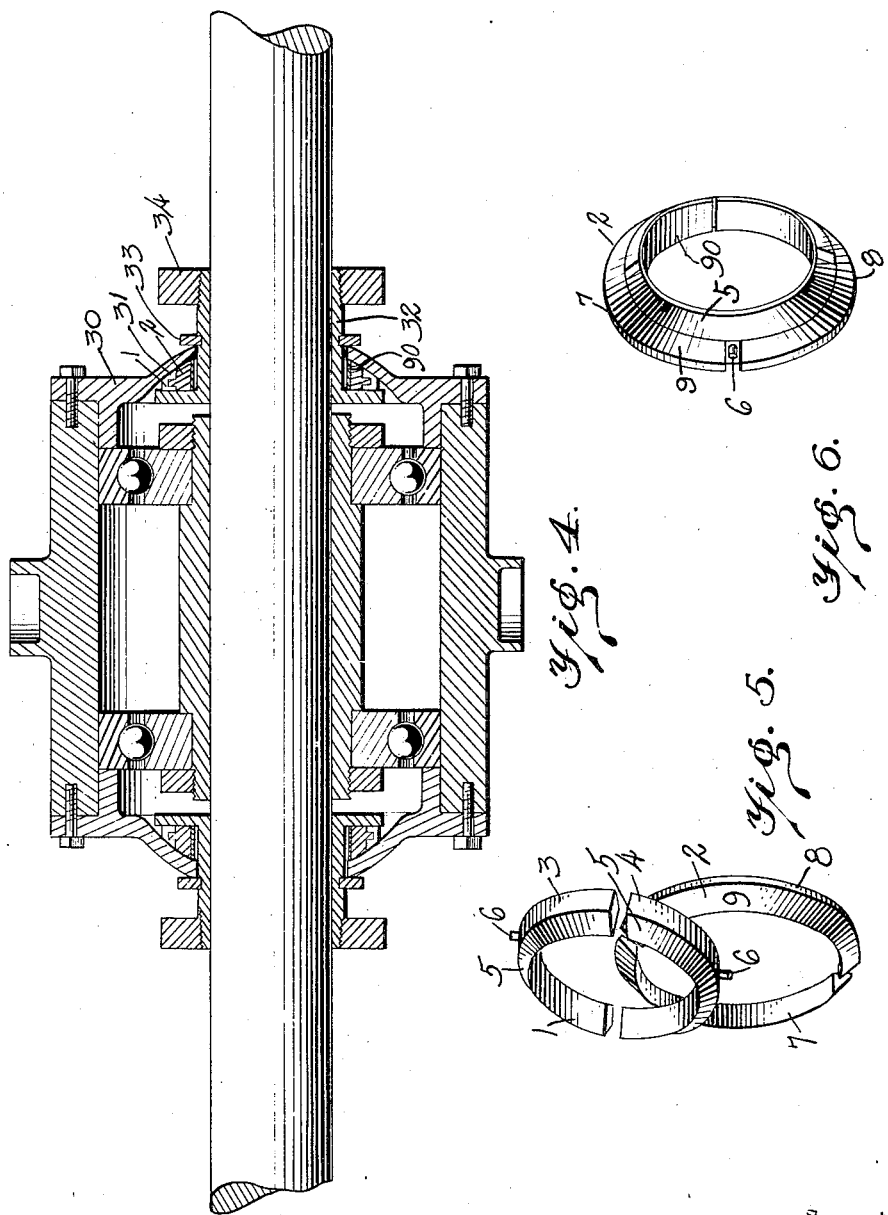

1,470,585

UNITED STATES PATENT OFFICE.

VICTOR E. NELSON, OF STRATHMORE, MICHIGAN.

PACKING RING.

Application filed August 18, 1919. Serial No. 318,093.

*To all whom it may concern:*

Be it known that I, VICTOR E. NELSON, a citizen of the United States, residing at Strathmore, county of Wayne, State of Michigan, have invented a certain new and useful Improvement in Packing Rings, and declare the following to be a full, clear, and exact description of the same, such as will enable others skilled in the art to which it pertains to make and use the same, reference being had to the accompanying drawings, which form a part of this specification.

This invention relates to metallic packing for use on shafts and other rotating members and has for its object to provide a metallic packing ring and cage of a character to prevent leakage of oil from the bearings or case through which the shaft may project and in which the shaft may project and in which wear is ordinarily compensated for and a tight joint continuously preserved. A further object of the invention is to provide a metallic packing of the character stated and a cage for supporting the packing in the desired relation with the shaft and in which the seats for the packing ring are provided, a feature of the construction being that the packing ring and parts of the cage are first assembled as a unit and adapted to be positioned as a unit in the required relation with the bearing and shaft. By the unit construction stated as an object of the invention, the ring is always maintained in its desired and particularly assembled relation with the seat.

In the construction set forth and shown in U. S. Patent No. 1,120,400 of Dec. 8, 1914, to myself and Mr. Reynold G. Nelson, an expanding packing ring is provided about a shaft which seats against a collar on the shaft and against a place secured to the bearing end. With such construction in case of repair or disassembly of the several parts, it is oftentimes difficult to replace the parts in the exact original relationship. variation of two or three thousandths of an inch being sufficient to destroy the usefulness of the packing. With the packing and cage herein disclosed, particularly by reason of the assembly of the several parts as a unit, the ring is never disassembled relative to its seat but is maintained strictly in desired relationship therewith, and the principal feature of this invention therefore is a construction of an expanding ring member seating between two parts of the cage member and the whole being capable of being handled as a unit after it has once been assembled. These objects and the several novel features of the invention are hereinafter more fully described and claimed and shown in the accompanying drawings in which—

Fig. 1 is a vertical longitudinal section of a shaft and bearing member showing my improved unit construction of a packing ring and cage.

Fig. 2 is a cross section taken on line 2—2 of Fig. 1.

Fig. 3 is a cross section taken on line 3—3 of Fig. 1.

Fig. 4 is a cross section of an alternative form of construction of the cage.

Fig. 5 is a detail in perspective of the parts of the packing rings.

Fig. 6 is a detail in perspective of the assembled rings.

Fig. 7 is a perspective view of a washer adapted to prevent displacement of the several parts.

The packing ring or rings may be of any approved type as for instance such as is shown in said U. S. Patent mentioned No. 1,204,400 which is super-expanded in character being formed of spring metal or the rings may be of several parts as is shown in Figs. 5 and 6. The ring is composite in type having an inner member 1 and an outer member 2. The inner member consists of two similar half circular parts 3 and 4 having a beveled face 5, each of said members being provided with an outwardly extending pin 6 on the periphery thereof. The outer member 2 consists of two half circular parts 7 and 8 provided with a coned face 9 which, when the outer ring is placed about the periphery of the inner members, is coextensive with the coned face 5 of the inner members. The parts 7 and 8 of the outer members are not completely half circular in form, the ends thereof being spaced as will be understood from Fig. 6 when assembled on the outer ring into which space extend the pins 6, and this prevents displacement of the inner members 3 and 4 relative to the outer members so that the interstice between the ends of the inner member may not be so positioned as to register with the spacing or interstice between the two parts of the outer member. These rings may be formed of any desired material as cast or malleable iron and are not expensive as in the construction shown in the said former U. S. Patent No. 1,120,400, but in order that the rings will have a tendency to expand, I provide in the interior of the inner ring a flat spring steel member 90, the width of which is equal to the depth of the inner ring and, by positioning the same in the circular form as shown, the tendency of the member 9 being to straighten out tends to expand the two composite rings. To utilize this tendency to expand either of the composite rings as herein described or of a super-expanding ring, if such be used, I provide a cage consisting of an inner member 10 and an outer member 11. The inner member 10 is of a character to fit the shaft as will be understood from Fig. 1. This inner member is cylindrical in form having at one end the laterally projecting circular flange 12 and the body thereof extends through an aperture at the center of the member 11 being provided with a circumferential groove 15 which, when the members are assembled, is just outside the point of the body of the member 10 engaged or contacted by the member 11. The member 11, it will be noted, is provided with a coned seat 13 and between this coned seat of the member 11 and the flange 12 of the member 10 is carried the packing ring and the chamber formed between the two parts is practically triangular in cross section, and the rings tend to expand outwardly between these two members, the coned face of the rings tightly engaging the coned seat 13 of the member 11 and the flat end of the assembled rings engaging the flange 12 whereby all leakage of oil between the two members is prevented and as the inner member fits the shaft no leakage of oil may occur between the member 10 and shaft. Thus the bearing shown in Fig. 1 is securely packed. After the members are assembled with the rings in position a washer 14 is set into the groove 15 of the shaft member 10 which prevents possible displacement of the desired relative position of the members and rings. This method of positioning a washer in a groove is not of itself new and other methods of securely fastening the two members in relative position may be employed but due to simplicity and efficiency of the described method of fastening I prefer to use the method described. For this purpose a washer is bent at the center to a V shape as shown in Fig. 7 which will permit the washer being placed on the member 11 and the two rings 17 and 18 of the washer by expanding operation are then forced over into the groove therefor and, when the washer is seated in the groove, it is practically impossible to disassemble the members without use of a chisel or a member destructive to the parts, the purpose being to so fasten the several members in the assembled relation as will best prevent tampering with the device or disassociation of the members under any ordinary condition.

The cage may be formed of sheet metal as is shown in Fig. 1, the outer member 11 having a flange 19 to engage over the end of the bearing case from which it may be readily disassociated or disassembled from the shaft. In this instance the member 10 is of a diameter to closely engage the shaft and in order to insure rotation of the member 10 with the shaft a tongue 20 is provided by slitting the outer end longitudinally on one side which is bent downward into the keyway 21 of the shaft. Thus the member 10 is made to rotate with the shaft while the member 11 is stationarily supported on the end of the housing which in the case illustrated is a housing for the bearings 22 of the shaft. It is further to be noted that the internal diameter of the assembled ring member is greater than the outer diameter of the tubular portion of the member 10. Thus the said ring does not ride on the rotating surface at that point. The flat end of the ring member, however, engages the flange 12 which is rotatable while the coned face engages the stationary seat 13. Due to the length of the coned face being greater than the length of the flat side of the rings engaging the member 12 there is greater friction between the coned face of the assembled rings and the seat therefor than exists between the flat face and flange 12. For this reason the rings remain stationary while the member 10 and flange 12 thereon rotate.

The cage, however, may be formed of cast metal as indicated in Fig. 4 in which the outer member 30 corresponding to the member 11 in Fig. 1 is bolted to the end of the bearing housing and is provided with a coned seat 31 for the coned face of the rings and also a tubular member 32 is provided engaging the shaft, the tubular member being held in position in the member 30 by means of the washer 33 of the same character as heretofore described relative to Fig. 1. The type of bearing illustrated in Fig. 4 is of a character ordinarily used with line shafting in which it is necessary to move the shaft longitudinally of the bearing to position the same. For this reason the member 32 is of a diameter permitting such longitudinal movement and, in order to prevent a leakage of oil from the bearing and tubular member 32 and further for the purpose of preventing an accidental longitudinal movement of the shaft in the bearing the outer end of the member 32 is formed with pipe threads on which, when the shaft has been positioned, is placed a nut 34. The turning of the nut onto the threaded end of the member 32 contracts the said end into fixed relation with the shaft causing the member 32 to turn with the shaft, as in the first instance described and, by reason of the bearing member having similar construction at the opposite end of the bearing when the nuts 34 have been turned onto the members 32 the shaft is held from endwise displacement. In all other respects the cage is identical with the first instance cited shown in Fig. 1 and the function of the packing ring and its relationship with the two parts of the cage is identical in either case cited. It is further evident that the type of bearing with which the packing ring and cage may be employed may be of any type desired either the ball or roller type shown in the accompanying drawings or of other known types, the function of the packing ring and cage having no relationship to the particular type of bearing as its function is solely that of preventing a leakage of oil from the bearing.

The coned seat in the member 11 or the member 30 is of the same diameter as the normal diameter of the coned face of the composite ring. With the spring member 9 introduced in the interior of the inner member of the composite ring, the tendency is to expand outward against the seat 13 or 31 causing it to rise into engagement with the flange of the member 10 or 32 as the case may be. In the use of the case of the ring of the said U. S. Patent No. 1,120,400 of Dec. 8, 1914, the normal diameter of the coned ring should be greater than that of the coned seat in order that when the parts are assembled the tendency of the ring is to wedge outwardly between the coned seat and flange of the inner cage member.

Having thus described my invention, what I claim and desire to secure by Letters Patent of the United States is—

1. A metallic packing for rods, shafts and the like comprising the combination with a shaft and its bearing, of an inner cage member removably secured to the shaft in a manner to rotate therewith and prevent leakage of oil therebetween, an outer cage member in overlapping relation with the inner member and providing a circular recess, the outer cage member being secured to the bearing, an expansible ring member in the said recess, the shape of the recess and ring in cross section being such that the ring in expanding assumes a wedging relation between the members, and means for securing the inner and outer cage members together as a unit.

2. A metallic packing comprising an expanding ring member, an outer and an inner cage member, the outer member being stationarily held and the inner member being relatively rotatable, a seat for the ring provided between the members with which the ring assumes a wedging relation preventing a leakage of oil between the members, and means for securing the cage members together.

3. A metallic packing comprising an expanding ring member, an outer and an inner cage member, the outer member being stationarily held relative to the inner member and overlapping the inner member providing a recess between the members for the ring, the ring wedging in the recess due to its form and tendency of the ring to expand, and means for securing the cage members in assembled relation.

4. A metallic packing comprising an expanding ring member, an inner and an outer cage member therefor one being rotatable relative to the other, one of the members having a laterally extending flange and the other of said members extending thereover providing a circular recess in which the ring expands preventing a leakage between the members.

5. A metallic packing for rods, shafts and the like comprising the combination with a shaft and its bearing, of an inner cage member removably secured to the shaft in a manner to rotate therewith and prevent leakage therebetween, said member having a cylindrical portion fitting the shaft and an outwardly extending flange at the inner end, an outer cage member fixedly attached to the bearing for the shaft and having a part extending in an overlapping relation with the said flange of the inner member forming therebetween a circular recess substantially triangular in cross section, a ring-like member of a shape to fit in the recess in wedging relation between the outer and inner cage members, and means for supporting the cage members in the assembled relation to permit positioning or removal of the packing as a unit structure.

6. A metallic packing comprising an expanding ring member having a coned face and a face at a right angle to the longitudinal axis of the ring, an outer cage member having a coned seat for the said coned face of the ring, an inner cage member having a laterally extending flange providing a seat for the other face of the ring, the tendency of the ring to expand between the seats tightly wedging the same therein to prevent a leakage of fluid, and means for securing the cage members together providing a unit construction permitting the assembling or disassembling of the same without disassociation of the several parts.

7. A metallic packing comprising an expanding ring member, an outer and an inner cage member having portions in overlapping relation forming a circular recess triangular in cross section for the ring, one of the said cage members being rotatable relatively to the other and the ring member assuming a wedging relation in the recess tending to force the members apart, one of the said members extending through the other, and means limiting the extent of relative movement of the members by the ring.

8. A metallic packing for rods, shafts and the like having a bearing, comprising the combination with an expansible ring like member, of an inner cage member secured to the shaft and having a laterally extending flange, an outer cage member secured to the bearing and overlapping the said flange portion providing a circular recess for the ring, the shape of the ring and recess in cross section being such that the ring in expanding assumes a wedging relation between the members preventing leakage of oil, and means for securing the cage members together.

9. A metallic packing for rods, shafts and the like having a bearing and housing therefor, comprising an expansible ring member, an inner cage member secured to the shaft in a manner to prevent a leakage of oil therebetween, a laterally extending flange on the said inner member, an outer cage member adapted to be secured to the housing and overlapping the said flange, the ring like member having a coned face and the overlapping portion of the outer member having a similar shaped seat for the ring, the tendency of the ring to expand causing the same to ride outwardly against the flange, and means for securing the cage members in the desired relation.

10. A metallic packing for rods, shafts and the like having a bearing and housing therefor, comprising an expansible ring member, an inner cage member having a body secured to the shaft in a manner to prevent a leakage of oil therebetween, a laterally extending flange on the said member, an outer cage member adapted to be secured to the housing and overlapping the said flange, the ring like member having a coned face and the said overlapping portion of the outer member having a similar shaped seat for the ring, the expansion of the ring in the seat causing the same to ride outwardly in contact with the said flange, the internal diameter of the ring being greater than the diameter of the body of the inner member about which it is positioned, and means for securing the cage members together in the desired relation permitting assembly or disassembly of the ring and cage members as a unit relative to the shaft and housing.

11. A metallic packing for rods, shafts and the like provided with a bearing and a housing therefor, comprising an expansible ring member, an inner cage member having a tubular portion through which the shaft extends, the said member being secured to the shaft in a manner to rotate therewith and to prevent a leakage of oil therebetween, an outer cage member adapted to be secured to the housing, the inner member having a laterally extending flange and the outer member overlapping the same and being apertured to receive the body of the inner member and providing a circular recess of triangular form in cross section between the overlapping portions of the members, the ring being of a shape to fit the recess and its tendency to expand causing the same to assume a wedging relation between the members tending to force the same apart, means limiting the extent of movement apart of the members by the ring, said means holding the members and ring in the desired relationship permitting the handling of the same as a unit.

12. In a metallic packing, a composite ring member formed of several parts adapted to be assembled in ring like shape, a spring member positioned within the ring tending to cause the parts to expand and the said parts forming a composite expansible ring member, and a cage for the said member formed of two parts shaped to provide a recess for the ring in which the said ring seats by its tendency to expand.

In testimony whereof, I sign this specification.

VICTOR E. NELSON.